Jan. 5, 1932.  D. E. AUSTIN  1,839,727
VEHICLE TOP INCLOSURE MEANS
Filed May 7, 1927  3 Sheets-Sheet 1
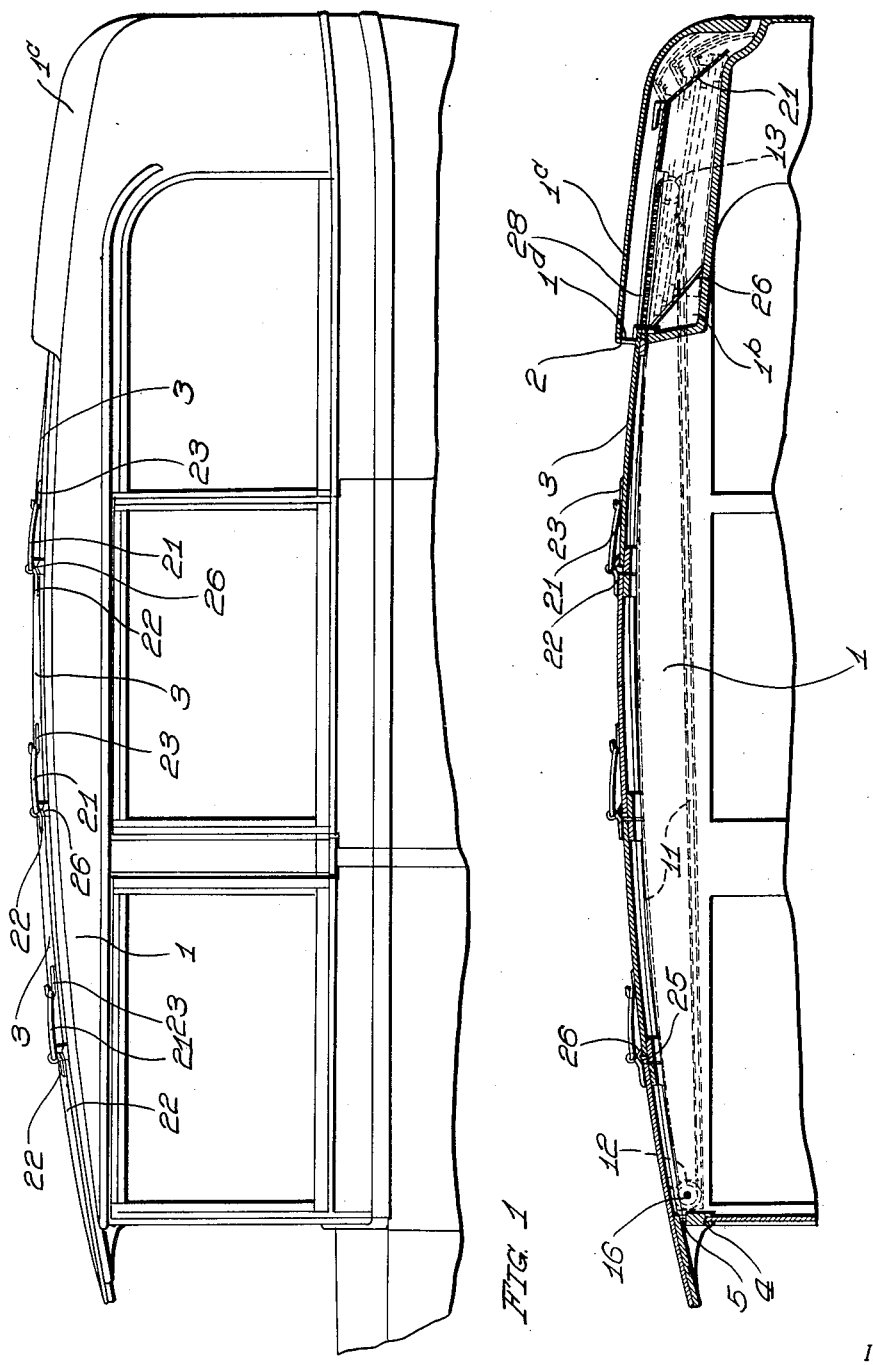
INVENTOR.
DWIGHT E. AUSTIN
BY A.B.Bowman
ATTORNEY

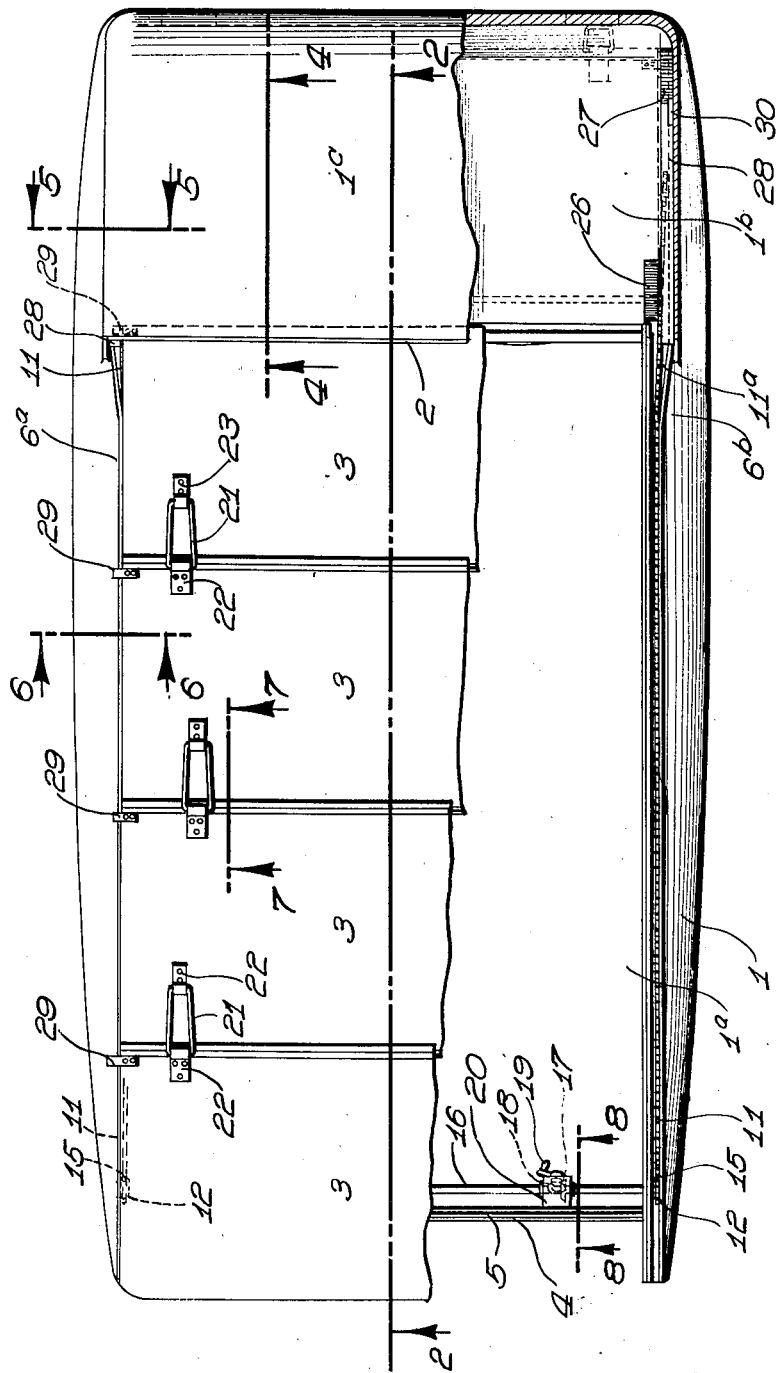

Jan. 5, 1932.   D. E. AUSTIN   1,839,727
VEHICLE TOP INCLOSURE MEANS
Filed May 7, 1927   3 Sheets-Sheet 3
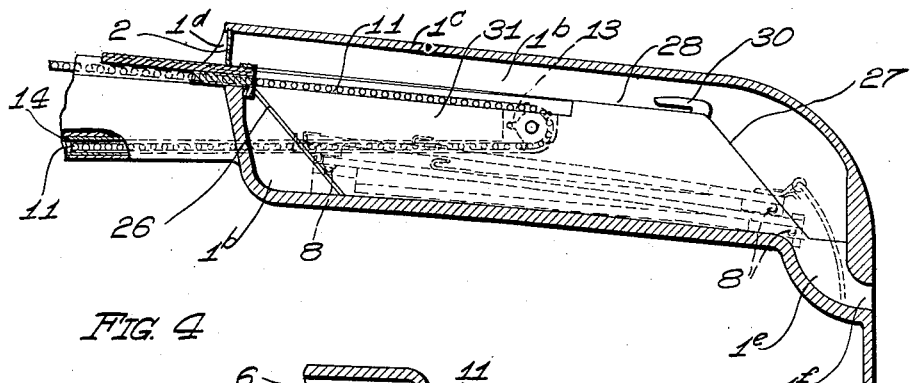
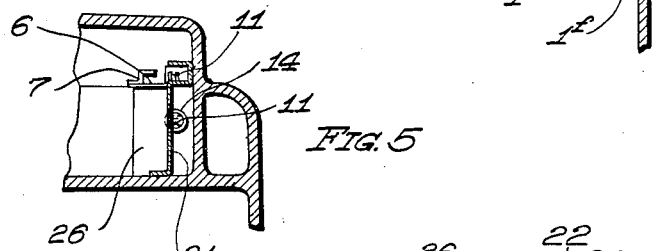
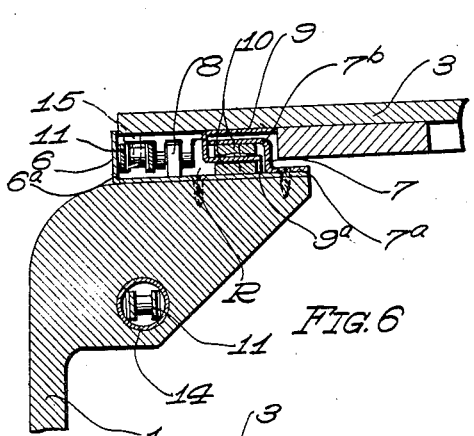
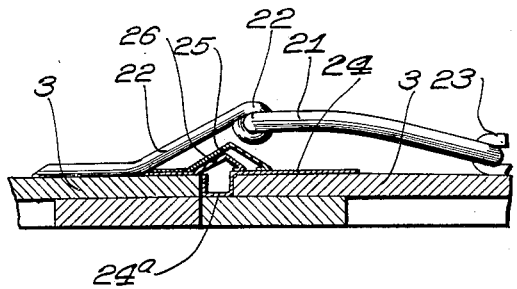
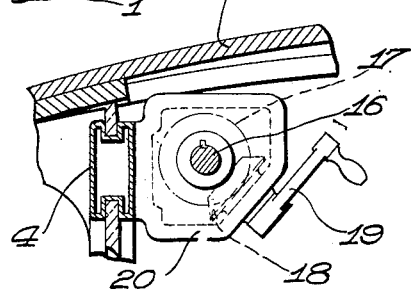
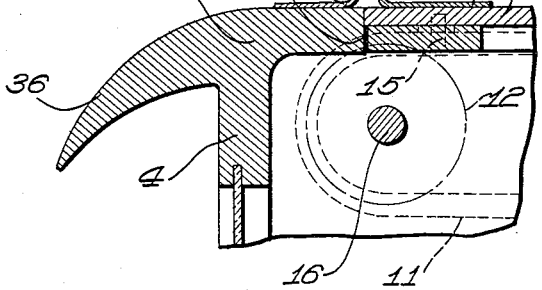
INVENTOR.
DWIGHT E. AUSTIN
BY A.B.Bowman
ATTORNEY Patented Jan. 5, 1932

1,839,727

UNITED STATES PATENT OFFICE

DWIGHT E. AUSTIN, OF LOS ANGELES, CALIFORNIA

VEHICLE TOP INCLOSURE MEANS

Application filed May 7, 1927. . Serial No. 189,704.

My invention relates to inclosure means for covering the opening, or openings, in the tops of vehicles, such as the rigid tops of inclosed automobiles, stages, or the like.

There are now in use certain types of automobiles, stages, or the like, which are provided with openings in the tops thereof for sightseeing purposes, for greater ventilation, and for sun. These openings heretofore have been covered by canvas, or other means, which was difficult to put over the opening, which consumed considerable time in uncovering and covering the opening, which was unsightly, which was not durable, and which flapped back and forth in the wind and when the vehicle was in motion.

The objects of this invention are: first, to provide a vehicle top inclosure means whereby the opening in the top may be uncovered or covered easily and quickly from the driver's compartment of the vehicle; second, to provide means of this class whereby a substantially rigid inclosure is formed for the opening in the top, which inclosure is rigid and durable, and which presents a neat appearance from the inside of the vehicle; third, to provide a means of this class which consists of a plurality of separate panels which may be shifted out of the way and temporarily concealed in a compartment therefor at the rear portion of the top of the vehicle when the opening is uncovered; fourth, to provide an inclosure means of this class for covering the opening in the top of the vehicle and for extending the same to the forward end thereof for forming the forward edge of the top and for serving as a visor in front of the windshield of the vehicle; fifth, to provide a means of this class which consists of a plurality of normally separate panels which may be placed in a compartment at the rear of the vehicle and which may be automatically coupled together as a continuous unit when desiring to draw the same over the opening; sixth, to provide novel means for connecting, or coupling, the normally separate panels together as a unit; seventh, to provide novel means of sealing the joints between the separate panels against the weather; eighth, to provide novel means for drawing said panels forwardly over the opening from the rear portion of the vehicle, and for shifting said panels to the rear; ninth, to provide novel means at the rear portion of the top of the vehicle for temporarily storing the inclosure means; tenth, to provide, as a whole, a novelly constructed and arranged inclosure means for vehicle tops; and, eleventh, to provide means of this class which is particularly simple and economical of construction proportionate to its functions, efficient in its operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon which form a part of this application in which:

Figure 1 is a fragmentary side elevational view of the upper portion of the body of an inclosed automobile incorporating my invention; Fig. 2 is a longitudinal sectional view thereof taken through 2—2 of Fig. 3; Fig. 3 is a plan view thereof showing portions of the panels and a portion of the top broken away and in section to facilitate the illustration; Fig. 4 is an enlarged fragmentary sectional view of the panel storing compartment at the rear portion of the vehicle, showing by dotted lines several panels positioned therein, the section being taken through 4—4 of Fig. 3; Fig. 5 is an enlarged transverse fragmentary sectional view thereof, taken through 5—5 of Fig. 3; Fig. 6 is an enlarged fragmentary sectional view thereof taken through 6—6 of Fig. 3, showing the mounting of the side edge portions of the panels on the top; Fig. 7 is an enlarged fragmentary sectional view thereof taken through 7—7 of Fig. 3, showing the connecting and sealing means of the panels; Fig. 8 is an enlarged fragmentary sectional view taken through 8—8 of Fig. 3, showing the means in the operator's compartment of the vehicle for drawing the panels forwardly and for uncovering the opening; and. Fig. 9 is an enlarged fragmentary sectional elevational view of the forward portion of a vehicle of slightly modified form of construction in which the panels do not extend to the forward end of the top.

Like characters of reference, refer to similar parts and portions throughout the several views of the drawings.

The upper portion of the body of the vehicle, shown in Figs. 1 and 2 and 3, is substantially the same as that of the conventional inclosed automobile, except that the top 1 thereof is preferably constructed on the arc of a circle. Said top 1 is provided with an opening 1a which is preferably as wide as possible, extending to near the edges of the top, as shown in Fig. 3, and extends preferably from near the rear end of the top to and through the forward end thereof. At the rear end of the top and below the normally upper surface thereof, is provided a pocket or compartment 1b of considerable depth, the front wall of said pocket, or compartment, forming the rear end of the opening 1a. The pocket, or compartment 1b is preferably covered by a superstructure 1c in the form of a penthouse, which is raised slightly above the upper surface of the top. The forward end of the supertop, or penthouse, is provided with an opening 1d which is normally covered by a yieldable gate, or rubber flap 2 which extends downwardly from the forward end of the superstructure, as shown in Figs. 2 and 4. The opening 1a of the top is covered by a plurality of panels 3 which are normally separate members but, when positioned over the opening, are connected together as a continuous inclosure unit, and, when the opening 1a is uncovered, the panels are separated and stored in superimposed relation in the storage compartment 1b at the rear end of the top. The forward panel 3 extends to the front end of the top and forms the front edge thereof, and, if desired, the same may extend a considerable distance forwardly from the windshield forming a visor therefor, as shown in Figs. 1, 2 and 3. The frame 4 of the windshield of the vehicle is preferably provided with a rubber weatherstrip 5 at its upper edge, which strip may be engaged by the under side of the forward panel 3 to provide a weather seal therewith, as shown in Fig. 2. The rear panel 3, when positioned over the opening 1a, is engaged at the upper side of its rear edge portion by the rubber weatherstrip, or other means, 2. Thus, a continuous, substantially rigid top structure is provided for the body of the automobile.

The side edges of the panels 3, when positioned over the opening, are mounted on runways R which are mounted on the top 1 and extend parallel and adjacent to the side edges of the opening 1a. The runway R consists preferably of a long angle plate 6 and a Z-shaped plate 7. The angle plate 6 is provided with a wide flange, which is secured against the top in any suitable manner, and with a relatively narrow flange 6a which extends upwardly at its outer edge, forming an inclosure and a guard. The one flange 7a of the Z-shaped plate 7 is secured against the wide flange of the angle plate 6 adjacent the edge of the opening 1a of the top. The other flange 7b of the Z-shaped plate is spaced upwardly from the wide flange of the angle plate 6 and extends toward the upwardly extending flange 6a thereof. At the under sides of the side edges of the panels 3, are mounted pairs of rollers 8 which roll on the wide flanges of the angle plate 6 between the flanges 6a and 7b, and support the panels 3. To the under side of the panels 3, inwardly from the rollers 8, are secured U-shaped strips 9. The one leg portion 9a of each U-shaped member 9 extends into the space between the flange 7b of the plate 7 and the wide flange of the plate 6 and is provided at its opposite sides with strips of felt 10 which engage the adjacent sides of said flanges forming a seal therewith and providing yieldable means to prevent rattle.

The panels 3 are carried forwardly and backwardly by conveyors in the form of link sprocket chains 11. Said chains, there being one at each side of the top, are continuous and are mounted at their forward ends on sprockets 12 and at their rear ends, on sprockets 13. The sprockets 12 are mounted on horizontal axes positioned transversely with the vehicle and immediately behind the frame 4 of the windshield thereof, while the sprockets 13 are mounted in the side walls of the compartment 1b at the rear end of the top of the vehicle. The upper portions of the chains 11 rest on the wire flanges 6a of the angle plate 6 between the flanges 6a thereof and the rollers 8, and assume arcuate courses by reason of the curvature of the angle plate 6 and of the top of the vehicle, while the lower portions of the chains extend in substantially straight lines between the sprockets. The lower portions of said chains extend through metal tubes 14 constructed preferably within the frame work at the side portions of the top structure, as shown in Figs. 2, 4 and 6. In the structure, shown and described, the forward panels 3 only are secured at their side edges to the chains, the same being secured thereto by screws 15, or other suitable means, as shown in Figs. 3 and 6. Since the forward panel 3 extends with its forward edge beyond the sprockets 12, said panel is secured to said chains a considerable distance backwardly from its forward edge.

The chains are simultaneously actuated by a means located preferably in the driver's compartment of the vehicle, as shown in Figs. 3 and 8. Said means consist of a shaft 16, at the opposite ends of which are mounted the sprockets 12, a bevel gear 17 on said shaft, another bevel gear 18 meshing with the former, and a crank 19 for actuating the bevel gear 18. Said gears are preferably mounted in a casing 20 secured to the forward portion of the frame of the vehicle, such as on the windshield frame 4 thereof.

The several panels are connected together as a continuous unit, when drawing said panels over the opening, when uncovering the opening, and when the panels are positioned over the opening, by means of a plurality of links 21. There are provided two sets of such links, one near each of the side edges of the panels, the links at each side being preferably staggered, as shown in Fig. 3. Said links are of considerable length and curved, or offset longitudinally, and are pivotally mounted at their forward ends on brackets 22 secured near the rear edges of the panels. The pivotal portions of the brackets 22 are extended above the normally upper surfaces of the panels and backwardly from their rear edges, as shown best in Fig. 7, and for the reasons to be set forth hereafter. The rear ends of the links 21 engage hooks 23 secured at the upper sides and near the forward edges of the adjacent panels.

The adjacent edges of adjacent panels are sealed against wind, dust, and rain, by a multiple sealing means at the adjacent edges of said panels. Said means consists of a metallic weatherstrip 24, secured to the forward edges of the panels, and a pair of superimposed, yieldable and resilient metal strips 25 and 26. The weatherstrip 24 is provided at its forward portion with a channel 24a which extends transversely with the top at the forward edge of the panel. The weatherstrip 25 is secured to the adjacent rear edge of the forward panel and is provided at its rear portion with an upwardly offset portion which yieldably engages at its rear edge the weatherstrip 24 immediately behind the channel 24a. The weatherstrip 26 is similarly constructed and positioned above the weatherstrip 25 and engages at its rear edge the upper side of the weatherstrip 24 behind the rear edge of the weatherstrip 25. The weatherstrip 26 provides the first sealing joint with the strip 24, the strip 25 the second sealing joint, and the channel 24a, the third means for excluding water from the interior of the vehicle.

The forward edges of the panels behind the forward panel, are provided with greater curvature than the adjacent edges of the respectively forwardly positioned panels. Thus, when the several panels are joined, when being drawn from the storage compartment 1b, the adjacent edges of the panels are resiliently joined together by reason of the difference of curvature of the adjacent edges, thus forcing the free edges of the weatherstrips 25 and 26 tightly against the weatherstrips 24.

At the opposite lateral sides of the compartment 1b, are provided special runways for directing the panels into the compartment, for disconnecting the same from each other, and for storing the same one above the other in such positions that the same may be readily withdrawn from the compartment and simultaneously connected together as a unit. The runways at each side of the compartment consist of tracks, or guides, 26 and 27, both of which are inclined downwardly and backwardly and are adapted to support, respectively, the forward and rear edge portions at the lateral sides of the panels, when the same are temporarily stored therein, and for guiding the same therein. The tracks, or guides, 26 are the rear terminations and are continuations of the wide flanges or tracks of the angle plate 6, as shown best in Figs. 3 and 4. The tracks, or guides, 27 are substantially parallel to the forwardly positioned tracks, or guides, 26 and are terminations and continuations of other tracks, or guides, 28 which are preferably substantially parallel to or concentric with the general curvature of the top. The tracks 28 are positioned above and outwardly from the track portions, or wide flanges, of the angle plate 6 and extend from the upper ends of the tracks, or guides, 27 forwardly to or beyond the forward ends of the compartment 1b, as shown in Figs. 3 and 4. At the rear ends or edges of the panels 3, are provided lugs 29 which extend outwardly beyond the side edges of said panels, as shown in Fig. 3. Said lugs are adapted to ride on the tracks 28 and to support the rear portions of said panels on said tracks and on the inclined tracks 27. The rollers 8, at the forward portions of the panels, are adapted to ride on the inclined tracks 26 when said panels are shifted beyond the rear ends of the track portions of the angle plate 6, as shown by dotted lines in Fig. 4. All of the panels, except the normally forward panel, are adapted to ride on said inclined tracks. The lugs 29 of the forward panel are slightly longer than those of the other panels and are adapted to be limited in their rearward shifting by guide, or retaining members 30, in the form of hooks, mounted near the rear ends of the tracks 28 outwardly from the extremities of the lugs 29 of the panels positioned behind the forward panel. To avoid interference by the chains 11 when lowering the panels into the compartment 1b, the rear end portions 11a of said chains are positioned outwardly and directed at an angle to underneath the tracks 28, as shown in Figs. 3 and 5. The rear portions of said chains are directed outwardly from points 6b forwardly from the front ends of the tracks 28, the points 6b being pivots formed by deflecting the upwardly directed flanges 6a of the angle plate 6 divergingly to the outer or lateral edges of the tracks 28, as shown best in Fig. 3. Thus, all of the panels 3 behind the normally forward panels will clear the chains and the forward panel 3, secured to said chains, will slightly distort the latter from their normal paths when the forward panel is shifted to its rearmost position. The inclosure and supporting means for the sprocket 13, at each side of the compartment 1b, provides supporting means at its upper edge for directing the course of the chains, said upper edge being a continuation of the wide flange of the angle plate 6.

At the rear end of the compartment 1b, is provided a long, transversely extending depression, or pocket 1e. This pocket is preferably provided with drain ports 1f at its lower portion to drain any water which may accumulate in the storage compartment. The pocket 1e is adapted to receive the free ends of the links 21 when the panels 3 are stored within the compartment 1b, as shown in Figs. 2, 3 and 4.

Assuming the opening in the top to be uncovered and the panels stored in the compartment 1b with the normally forward panel mounted on the track 28 against the hook member 30, the panels will be drawn forwardly from the compartment 1b when the crank 19 is rotated clockwise. The normally forward panel, being directly secured to the chains, will be drawn forwardly first. The links 21 of the normally forward panel will ride over the brackets 22 of the next lower panel and will then ride over said panel until the links of the former engage the hooks 23 of the latter, at which time the latter panel will be drawn upwardly and forwardly until the same rides on the runway R. The next lower panel will be then similarly drawn upwardly and forwardly until the lowest and rearmost panel will be drawn over the opening.

It will be here noted that the links 21 at each side of the panels are staggered so that the same may readily ride over each other and the brackets 22 without interference. The brackets 22 are extended backwardly and raised with pivotal portions above the upper surfaces of the panels so that the links 21 may readily fold downwardly over the other links, as shown in Fig. 2.

In the modified structure shown in Fig. 9 of the drawings, the opening 1a in the top 1 does not extend through the front end of said top but terminates a slight distance backwardly from the forward end. In this structure, the top may be provided with a permanent visor, or shield 36. This structure is particularly adapted for stages so that lights, placards, of illuminated signs, may be mounted at the front portion of the top thereof. In this construction, a special sealing means is preferably provided between the front edge of the forward panel and the top. Said sealing means may consist of a sealing strip 37 secured to the upper side of the forward edge portion of the panels 3, and a sealing strip 38 secured to the top and extended backwardly over the opening. The forward portion of the strip 37 is preferably bent backwardly in curved form, as indicated by 37a, which portion is adapted to engage the under and inner side of the curved channel portion 38a extending partially over the opening. The rear edge of the portion 38a is turned upwardly at an angle, as indicated by 38b, to facilitate the raising of the portion 38a when engaged by the forward edge of the portion 37a. The rear edge of the portion 37a also engages an inclined surface of the portion 38a so that disengagement of the sealing members and unlocking of the panels are facilitated. In this construction, the chain 11 may be secured to the forward panel 3 near the forward edge thereof, as shown.

Though I have shown and described a particular construction, combination and arrangement of parts and portions, and a certain modification thereof, I do not wish to be limited to this particular construction, combination and arrangement, nor to the modification, but desire to include in the scope of my invention the construction, combination and arrangement substantially as set forth in the appended claims.

Having thus described my invention what I claim as new and desire to secure by Letters Patent is:

1. In a top inclosure means, the combination with a vehicle having an opening in its top, and a panel storage compartment adjacent the rear end of said opening, said compartment having laterally offset inclined tracks at its opposite lateral sides, of a plurality of normally separate panels, and means connecting said panels together to form an inclosure for and when positioned over said opening, said panels being adapted to be shifted backwardly into said compartment and stored in superimposed relation therein, the forward and rear ends at the lateral sides of said panels being adapted to ride on said inclined tracks for placing the same in offset relation with the upper panels forwardly of the next lower panels.

2. In a top inclosure means, the combination with a vehicle having an opening in its top, and a panel storage compartment adjacent the rear end of said opening, said compartment having laterally offset inclined tracks at its opposite lateral sides, of a plurality of normally separate panels, and means connecting said panels together to form an inclosure for and when positioned over said opening, said panels being adapted to be shifted backwardly into said compartment and stored in superimposed relation therein, the forward and rear ends at the lateral sides of said panels being adapted to ride on said inclined tracks, said means comprising links, secured to the rear edge portions of said panels, and hooks secured to the forward portions of said panels, the links of the upper panels in said compartment engaging the hooks of the next lower panels when the upper panel is partially withdrawn from said compartment.

3. In a top inclosure means for vehicles, the combination with a vehicle having an opening in its top, a plurality of normally separate panels adapted to be positioned side by side and in overlapped relation over said opening, there being provided a panel enclosing pocket in the top at one side of said opening for receiving all of said panels in separated and superimposed relation, said panels having latch members at their adjacent edges for latching a pair of panels together and for allowing said panels to be disconnected and separated both over the opening and in said pocket, and means for drawing and withdrawing one or more of said panels over and from said opening, said pocket having a depression below the level of the panels when positioned over the opening, the rearmost of the respective panels, when the connected panels are drawn backwardly, being automatically unlatched from the adjacent forward panel and lowered toward the bottom of the pocket as and when the same are consecutively shifted into said pocket, said panels being automatically connected together when said panels are drawn over said opening for drawing the other panels over the opening.

4. In a top inclosure means, the combination with a vehicle having an opening in the top thereof, and a storage compartment at the rear portion of the vehicle, a plurality of panels slidably mounted at their opposite edges at the opposite sides of the opening, said panels having overlapping portions adapted to be overlapped when the panels are positioned over the opening for sealing the spaces between adjacent panels, and latch members pivotally mounted at the rear portions of the consecutive forward panels and adapted to extend beyond the rear edges thereof, the adjacent portions of the consecutive rear panels having hooks adapted to be engaged by the latch members for connecting adjacent panels rigidly together, said panels being slidable into said compartment and adapted to be positioned therein in separated superimposed relation with the latch members disconnected from said hooks, the uppermost panels in the compartment being adapted to be consecutively withdrawn and the latch members connected thereto being adapted automatically to engage the hooks on the next lower panel for raising the latter and withdrawing the same from the compartment in connected and overlapped relation with the next forward panel.

5. In a top inclosure means, the combination with a vehicle having an opening in the top thereof and a storage compartment at the rear portion of the vehicle, a plurality of panels shiftably mounted at their opposite edges at the opposite sides of the opening, said panels having overlapping portions adapted to be overlapped when the panels are positioned over the opening for sealing the spaces between adjacent panels, latch members pivotally mounted at the rear portions of the consecutive forward panels and adapted to extend beyond the rear edges thereof, the adjacent portions of the consecutive rear panels having hooks adapted to be engaged by the latch members for connecting adjacent panels rigidly together, said panels being slidable into said compartment and adapted to be positioned therein in separated superimposed relation with the latch members disconnected from said hooks, the uppermost panels in the compartment being adapted to be consecutively withdrawn and the latch members connected thereto being adapted automatically to engage the hooks on the next lower panel for raising the latter and withdrawing the same from the compartment in connected and overlapped relation with the next forward panel, and continuous conveyers mounted in the top of the vehicle at the opposite sides of the opening and connected only to the normally forward panel for drawing all of said panels from said compartment over the opening and also for withdrawing all of said panels from over the opening into said compartment.

6. In a top inclosure means, the combination with a vehicle having an opening in the top thereof and a storage compartment at the rear portion of the vehicle, a plurality of panels shiftably mounted at their opposite edges at the opposite sides of the opening, said panels having overlapping portions adapted to be overlapped when the panels are positioned over the opening for sealing the spaces between adjacent panels, and latch members pivotally mounted at the rear portions of the consecutive forward panels and adapted to extend beyond the rear edges thereof, the adjacent portions of the consecutive rear panels having hooks adapted to be engaged by the latch members for connecting adjacent panels rigidly together, said panels being slidable into said compartment and adapted to be positioned therein in separated superimposed relation with the latch members disconnected from said hooks, the uppermost panels in the compartment being adapted to be consecutively withdrawn and the latch members connected thereto being adapted automatically to engage the hooks on the next lower panel for raising the latter and withdrawing the same from the compartment in connected and overlapped relation with the next forward panel, the normally forward panel being adapted to be disconnected from the other panel for drawing the same over the opening independently of the other panels, the normally forward panel being adapted also to be withdrawn from the compartment with only some of the other panels immediately behind the same.

In testimony whereof, I have hereunto set my hand at Los Angeles, California, this 11th day of April, 1927.

DWIGHT E. AUSTIN.